United States Patent
Kawai et al.

(10) Patent No.: US 10,133,258 B2
(45) Date of Patent: Nov. 20, 2018

(54) CONTROL DEVICE FOR A MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Toshimasa Uetama, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 174 days.

(21) Appl. No.: 15/108,195

(22) PCT Filed: Dec. 27, 2013

(86) PCT No.: PCT/JP2013/085182
§ 371 (c)(1),
(2) Date: Jun. 24, 2016

(87) PCT Pub. No.: WO2015/097887
PCT Pub. Date: Jul. 2, 2015

(65) Prior Publication Data
US 2016/0327938 A1 Nov. 10, 2016

(51) Int. Cl.
*G05B 19/4093* (2006.01)
*G05B 19/416* (2006.01)
*G05B 19/4068* (2006.01)

(52) U.S. Cl.
CPC ... *G05B 19/40938* (2013.01); *G05B 19/4068* (2013.01); *G05B 19/40937* (2013.01); *G05B 19/416* (2013.01); *G05B 2219/32281* (2013.01); *G05B 2219/32325* (2013.01); *G05B 2219/35307* (2013.01); *G05B 2219/35528* (2013.01); *G05B 2219/36305* (2013.01); *Y02P 90/265* (2015.11)

(58) Field of Classification Search
CPC .................. G05B 19/40938; G05B 19/416
See application file for complete search history.

(56) References Cited

U.S. PATENT DOCUMENTS

| 4,835,700 A | 5/1989 | Tanaka et al. |
| 5,266,876 A | 11/1993 | Ito et al. |
| 5,608,641 A * | 3/1997 | Guhl ................. G05B 19/4093 318/568.1 |

(Continued)

FOREIGN PATENT DOCUMENTS

| CN | 101454106 | 6/2009 |
| CN | 102854842 | 1/2013 |

(Continued)

OTHER PUBLICATIONS

International Search Report dated Feb. 18, 2014, directed to International Application No. PCT/JP2013/085182; 2 pages.

*Primary Examiner* — Vincent H Tran
(74) *Attorney, Agent, or Firm* — Morrison & Foerster LLP

(57) ABSTRACT

A control apparatus for controlling a machine tool on the basis of a machining program is provided with a program analysis unit which analyzes an input machining program, a process table creation unit which, on the basis of the results of the analysis by the program analysis unit, creates a process table that sequentially lists processes according to the execution flow of the machining program, and a display unit which displays the process table created by the process table creation unit.

3 Claims, 12 Drawing Sheets

(56) References Cited

U.S. PATENT DOCUMENTS

| | | | |
|---|---|---|---|
| 6,401,004 B1 * | 6/2002 | Yamazaki | G05B 19/40937 318/568.1 |
| 6,505,092 B1 | 1/2003 | Fukaya et al. | |
| 2002/0031019 A1 | 3/2002 | Nakamura | |
| 2004/0215364 A1 | 10/2004 | Dutsch et al. | |
| 2009/0112341 A1 | 4/2009 | Tanaka et al. | |
| 2011/0035044 A1 * | 2/2011 | Takahashi | G05B 19/4069 700/178 |
| 2012/0179284 A1 * | 7/2012 | Nakamura | G05B 19/4068 700/160 |
| 2013/0006396 A1 | 1/2013 | Kito et al. | |

FOREIGN PATENT DOCUMENTS

| | | |
|---|---|---|
| JP | 62-105202 | 5/1987 |
| JP | 1-291307 | 11/1989 |
| JP | 02-167647 | 6/1990 |
| JP | 5-289729 | 11/1993 |
| JP | 2006-99284 | 4/2006 |
| JP | 2007-133787 | 5/2007 |
| JP | 2008-226112 | 9/2008 |
| JP | 2010-67101 | 3/2010 |
| JP | 2011-59801 | 3/2011 |
| WO | WO-1998/019820 | 5/1998 |
| WO | WO-9819820 | 5/1998 |

\* cited by examiner

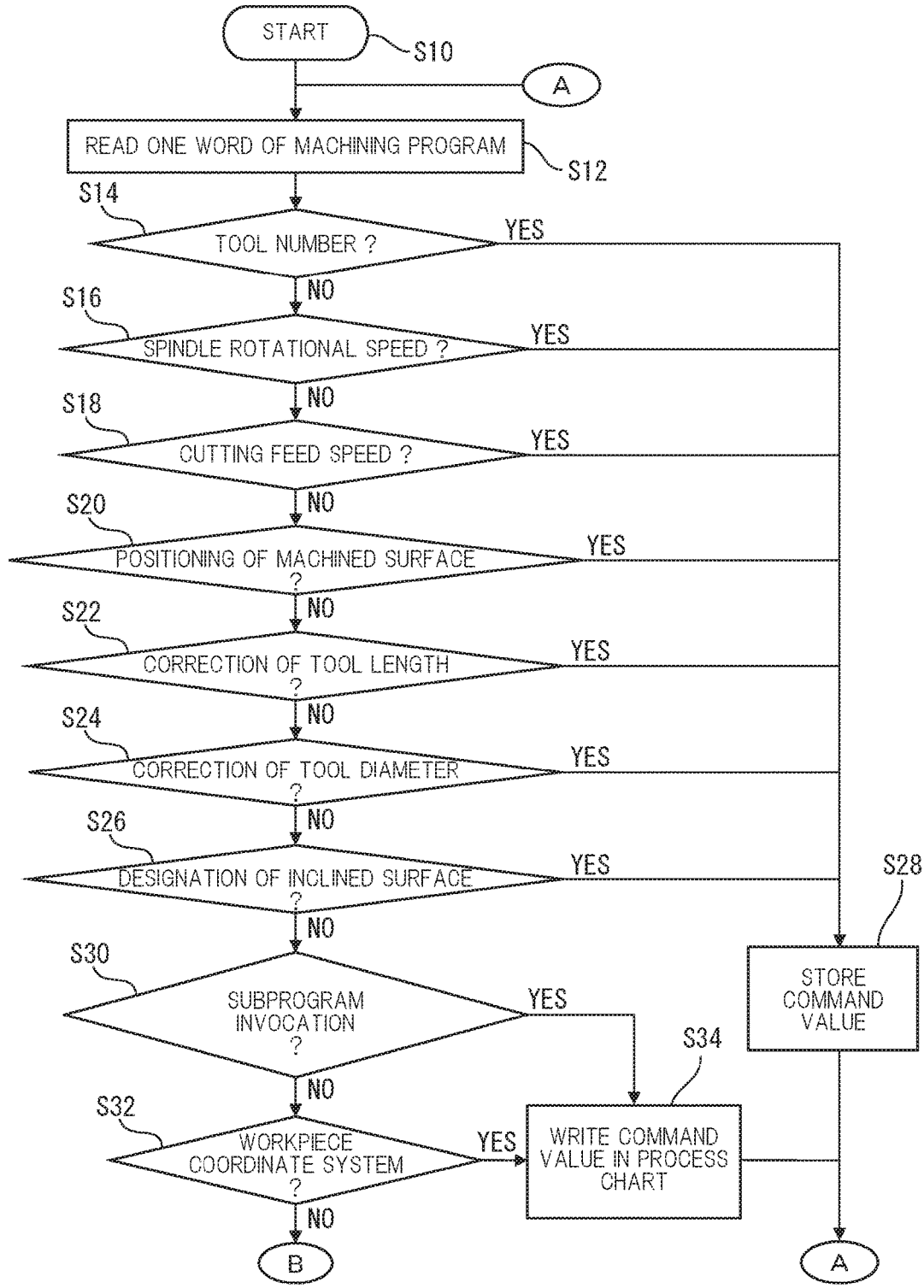

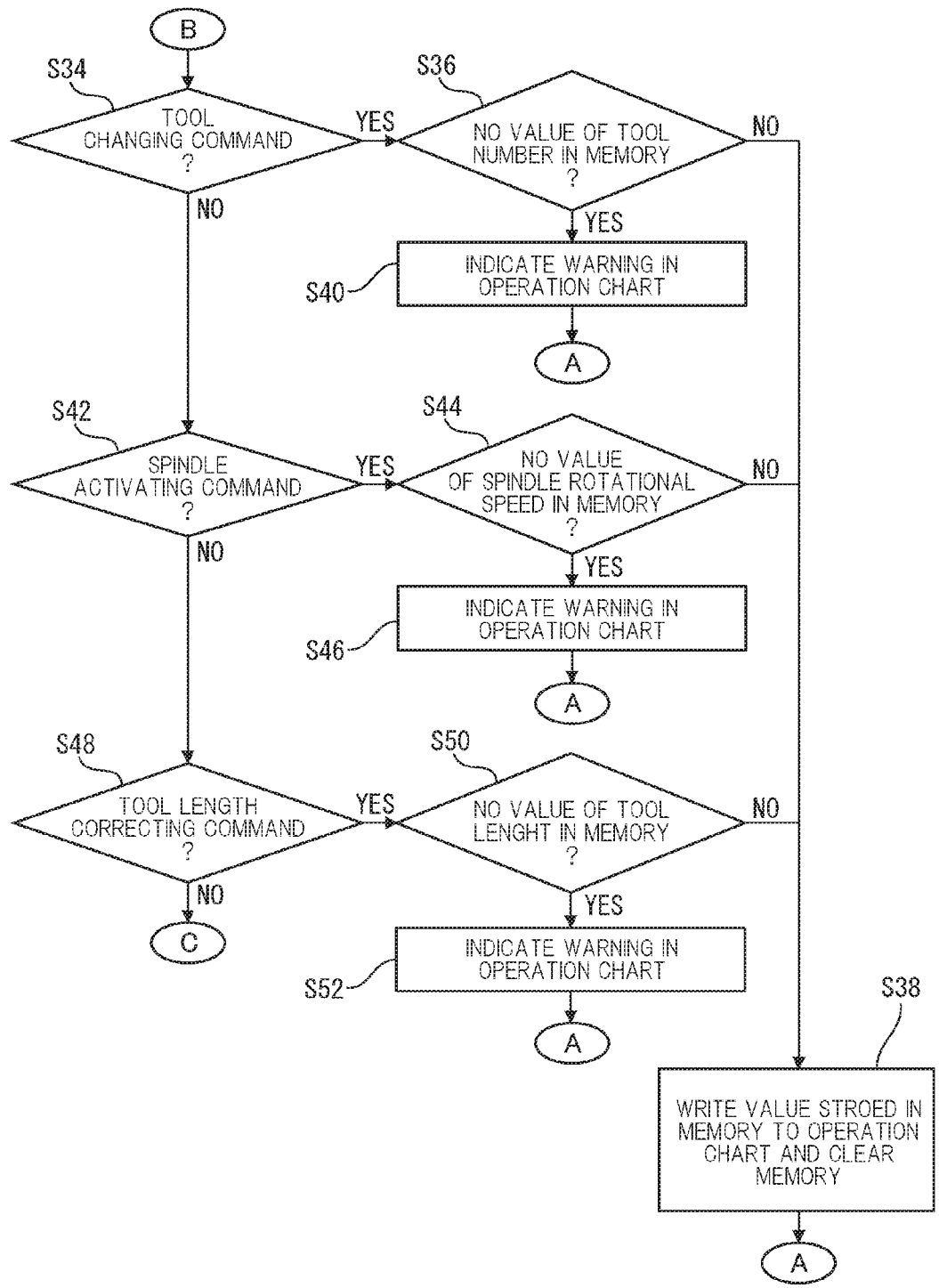

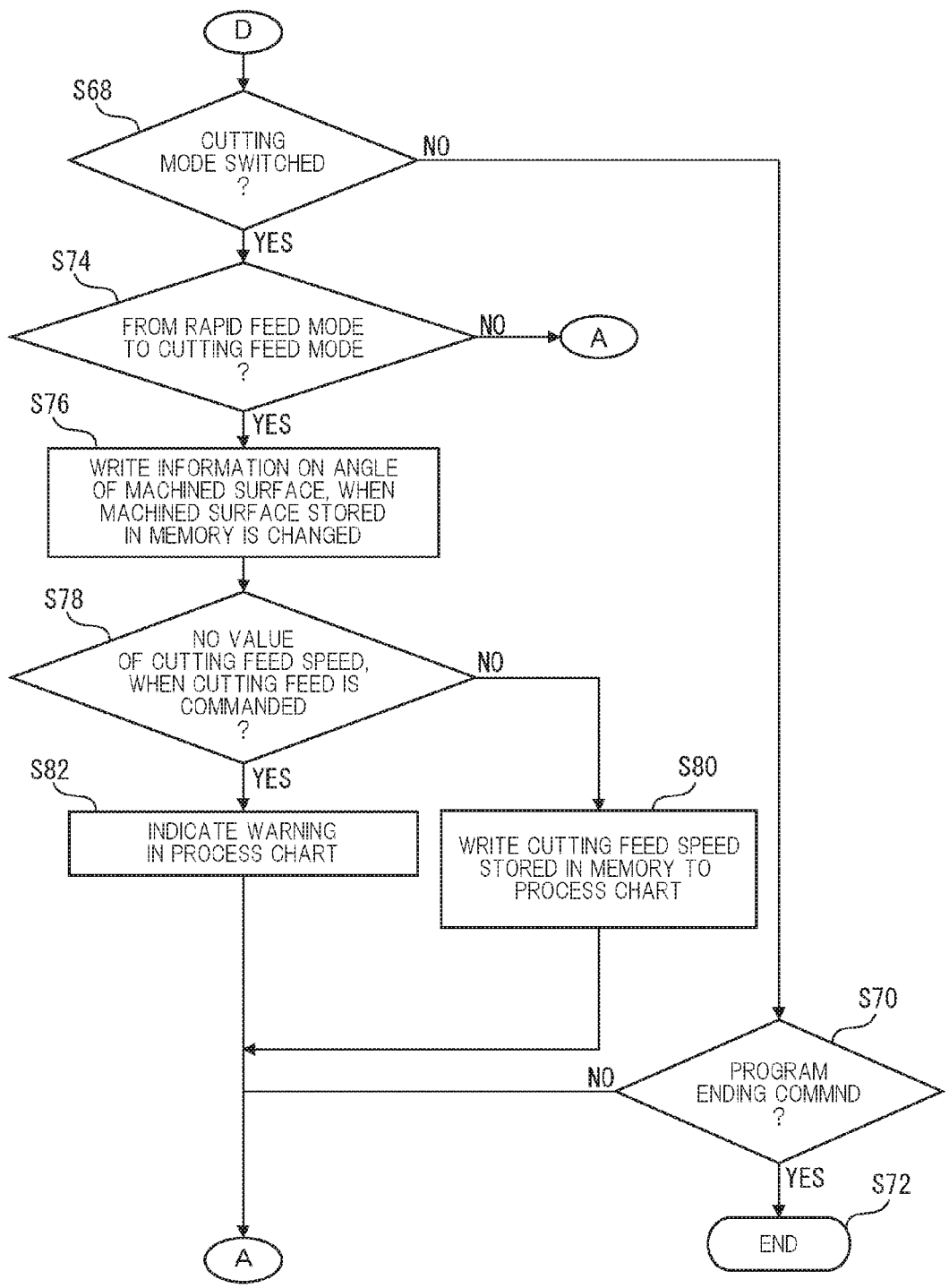

FIG. 3B

| O0001: | SAMPLE WORK | | | | | | | |
|---|---|---|---|---|---|---|---|---|
| TOOL | SUBPROGRAM | MACHINED SURFACE | COORDINATE SYSTEM | | SPINDLE | FEED | TOOL LENGTH | TOOL DIAMETER |
| + | 1 FACE MILL T1 FM D125 | | | | | | | |
| | | A0.0 C0.0 | G54 | | S4000 | F2400 | H1=80.1234 | (62.5) |
| | | A-30.0 C90.0 | | G68.2 | | | | |
| − | 2 DRILL T2 DR D8 | | | | | | | |
| | | A0.0 C0.0 | G55 | | S6000 | ERROR | H2=234.5678 | (4.0) |
| | | A-30.0 C90.0 | | G68.2 | | | | |
| − | 3 END MILL T3 EM D16 | | | | | | | |
| | | A0.0 C0.0 | G56 | | S8000 | F1200 | H3=111.2222 | |
| | ⇒P1000:CIRCULAR POCKET | | | | | | | D3=8.1234 |
| | ⇒P1010:TRIANGLE POCKET | | | | | | | D3=8.1234 |
| | ←P1000 | | | | | | | |
| | ←P0001(MAIN) | | | | | | | |
| | | A-30.0 C90.0 | | G68.2 | | | | |
| | ⇒P1000:CIRCULAR POCKET | | | | | | | D3=8.1234 |
| | ⇒P1010:TRIANGLE POCKET | | | | | | | D3=8.1234 |
| | ←P0001(MAIN) | | | | | | | |
| END | | | | | | | | |

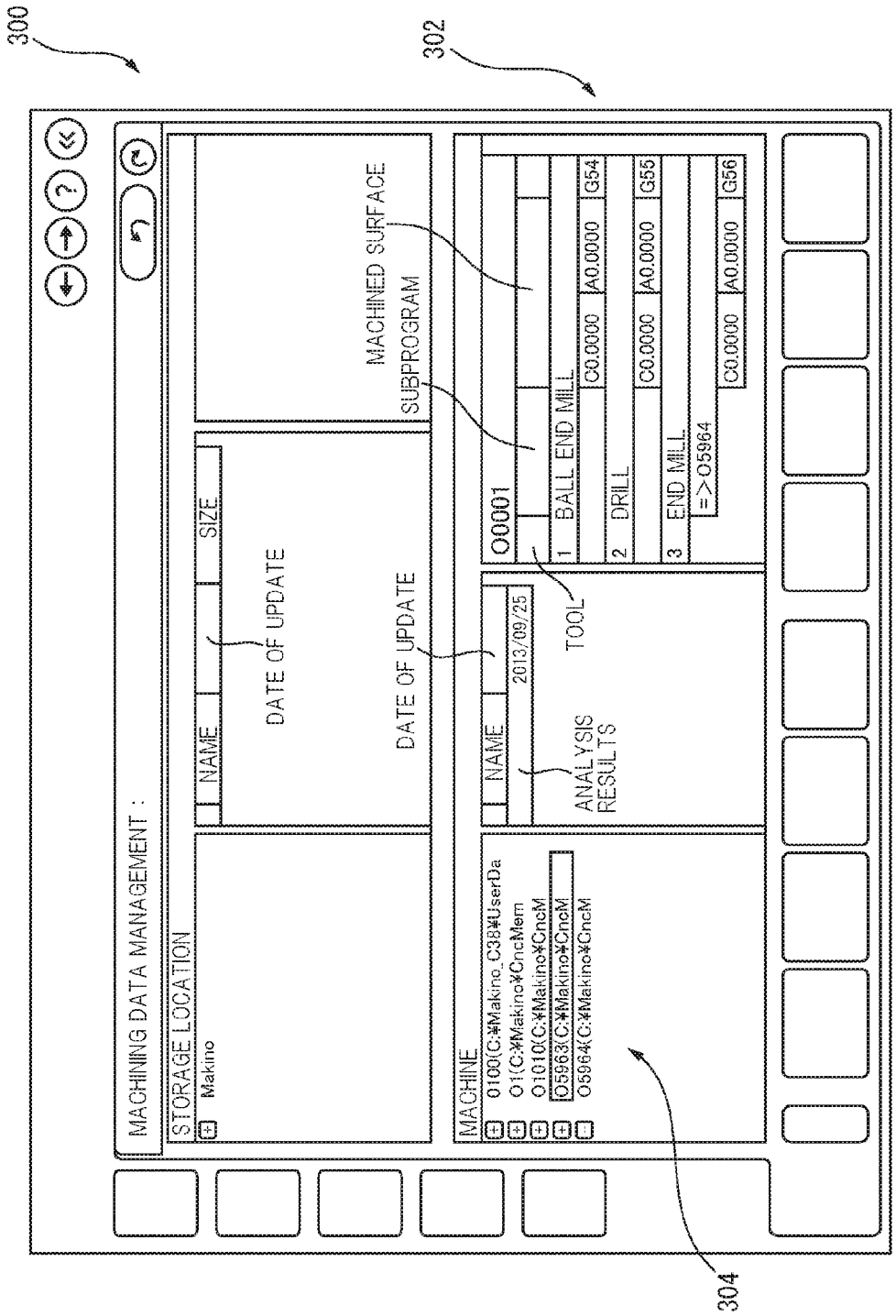

FIG. 4A

| TOOL DATA>--LIST | | | | | | |
|---|---|---|---|---|---|---|
| USED TOOL | | | | | | |
| NAME OF MACHINING DATA | | | | | | |
| O100(CNC_MEM/USER/O100) | | | | | | |
| O200(CNC_MEM/USER/GEAR/O200) | | | | | | |
| @O300(CNC_MEM/USER/O300) | | | | | | |
| TOOL NUMBER | POT | TOOL TYPE | REFERENCE TOOL DIAMETER | REFERENCE TOOL LENGTH | NUMBER OF CUTTING EDGES | NOTE |
| 71 | NON | END MILL | 16.0000 | 180.0000 | 2 | |
| 31 | NON | DRILL | 8.0000 | 155.0012 | 4 | |
| 28 | NON | TAP | M5 | 130.0 | | M5 × 30 tap steel |
| O400(DATA.SV/O400) | | | | | | |

400, 402, 404, 406, 408, 410

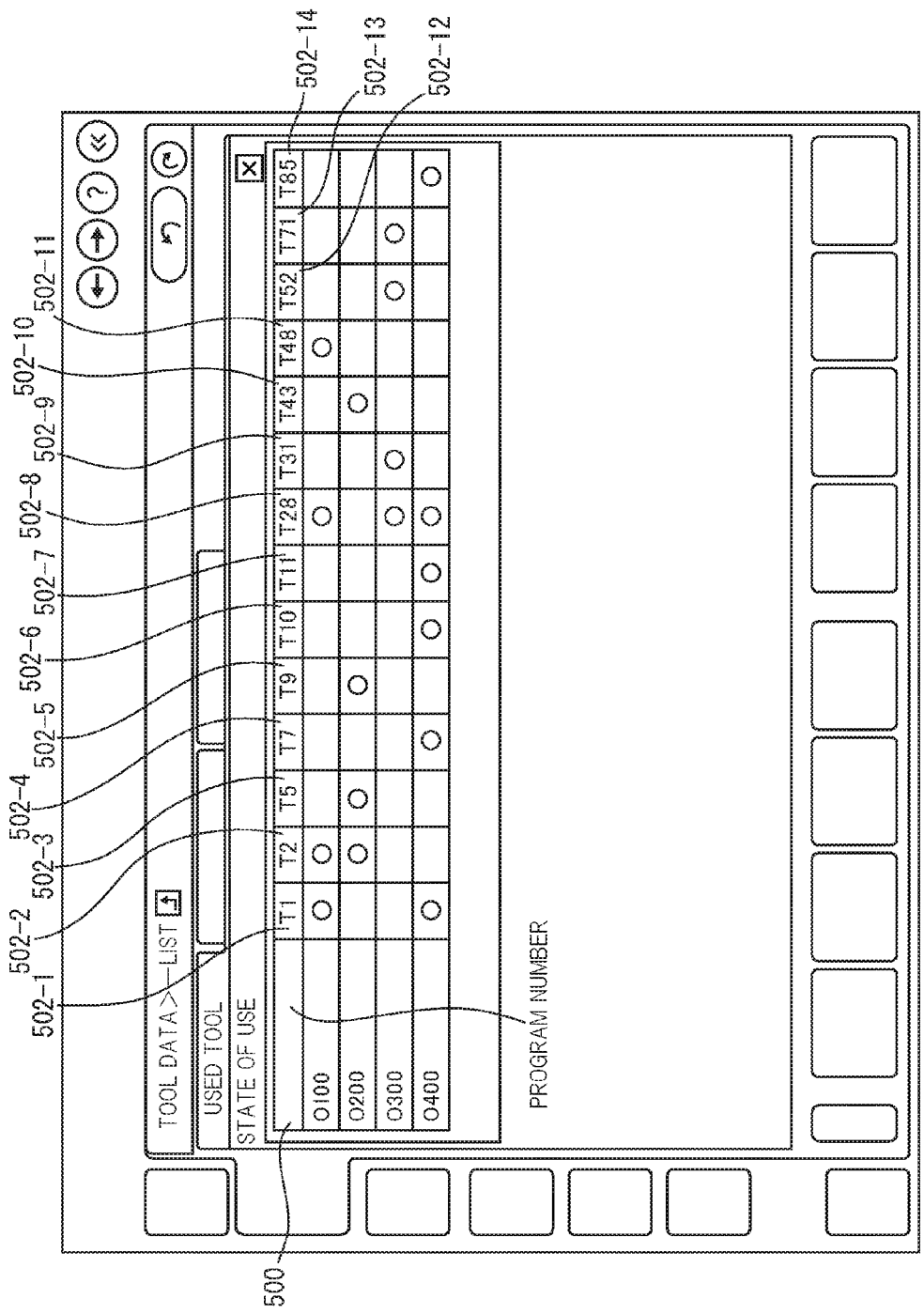

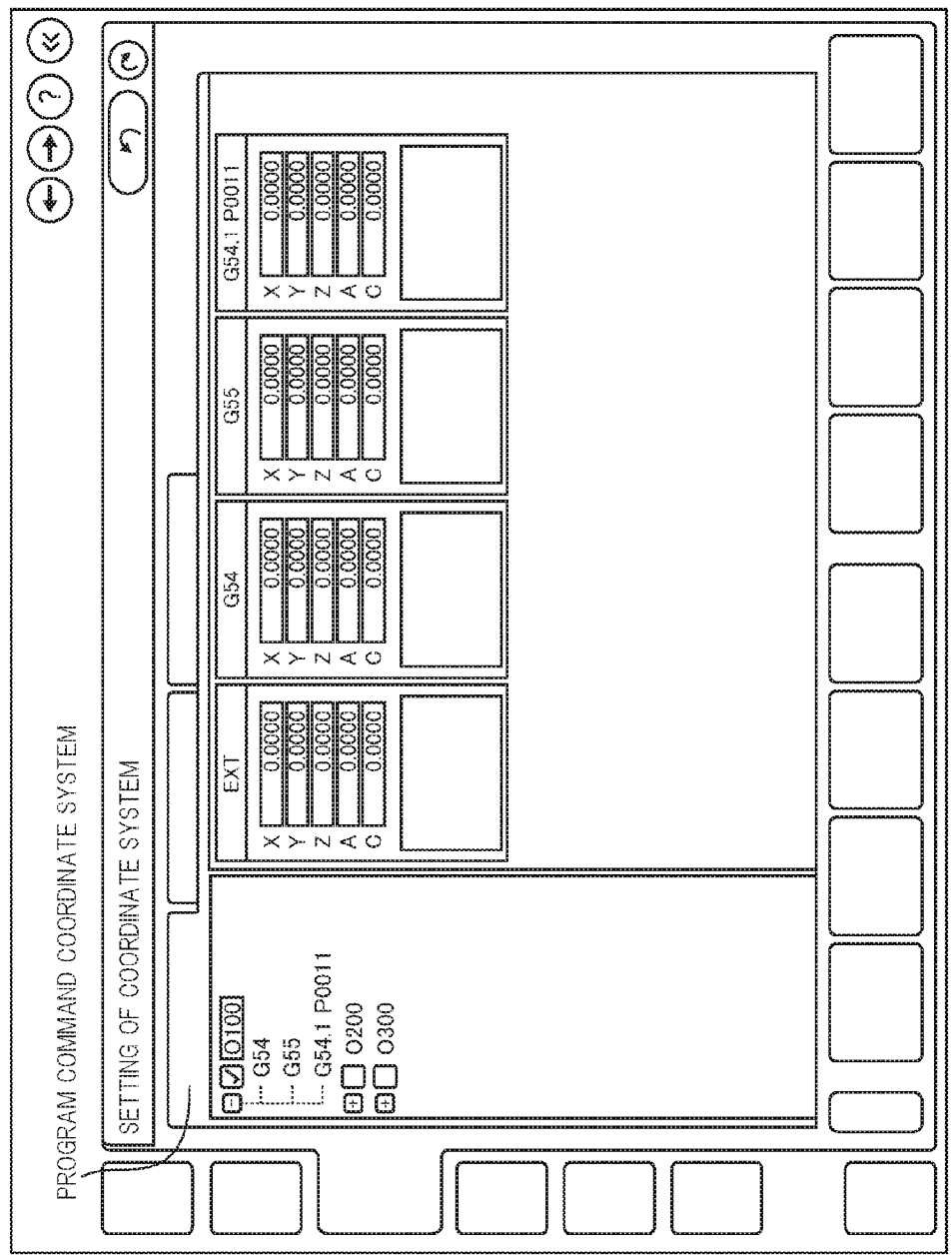

FIG. 5B

| | G54 | G55 | G56 | G57 | G58 | G54.1 P0002 | G54.1 P0011 |
|---|---|---|---|---|---|---|---|
| O100 | ● | ○ | | | | | ● |
| O200 | ● | | ○ | | | | ● |
| O300 | | | | ○ | ○ | ○ | |

PROGRAM NUMBER CONFIRMATION

| | DETAILS OF WARNING | PROGRAM NUMBER |
|---|---|---|
| ☐ | G54 REDUNDANT | O100,O200 |
| ☑ | G54, P0011 REDUNDANT | O100,O200 |

CONFIRMATION OF REDUNDANCY

SETTING OF COORDINATE SYSTEM

PROGRAM COMMAND COORDINATE SYSTEM

600

CONTROL DEVICE FOR A MACHINE TOOL

CROSS-REFERENCE TO RELATED APPLICATIONS

This application is a U.S. National Stage patent application of International Patent Application No. PCT/JP2013/085182, filed Dec. 27, 2013, which is hereby incorporated by reference in the present disclosure in its entirety.

FIELD OF THE INVENTION

The present invention relates to a control device for a machine tool which analyzes a machining program to extract commands in the machining program.

BACKGROUND OF THE INVENTION

In a machine tool controlled by an NC device, a workpiece is machined in accordance with a machining program. Machining programs are written with the known G-code and the like so that past machining programs can be reused, and a machining program can be used for another machine tool.

For example, Patent Literature 1 describes an NC machining system and method adapted to analyze the machining method based on an NC machining program so that the necessary machining conditions are extracted so as to store them to a database which can be used when creating an NC program.

Patent Literature 1: WO 1998/019820

SUMMARY OF THE INVENTION

According to the NC system and method described in Patent Literature 1, machining conditions, which can be obtained only from an on-site know-how, a test cut or a simulation, can be surely extracted, along with program corrections or revisions, and formed into a database. Therefore, a knowledge base, which is very useful to create a database, can be easily composed. However, as described above, an NC program is described with the G-code or the like which it is not normally easily understood, and therefore the pre-check of a program requires much time in addition to an operator's skill and concentration.

Thus, it is very difficult for a regular operator to preliminary check a machining program (NC program) as to whether or not the spindle rotational speed, the cutting feed speed, the coordinate system and the tool type are correctly programmed or there is a setting omission.

The invention is directed to solve the problem of the prior art, and the object of the invention is to provide a control device for a machine tool which allows an operator to easily understand the machining process and easily find a setting error in a machining program so that the machining program can be corrected.

To achieve the already explained object, according to the present invention, a control device for controlling a machine tool based on a machining program, characterized by a program analyzing section for analyzing a machining program which has been input; a process chart creating section for creating a schedule by arranging the respective processes of a machining program in the execution sequence of the machining program, based on the results of the analysis conducted by the program analyzing section; and a displaying section for displaying the schedule created by the process chart creating section is provided.

According to the invention, a machining program is analyzed and a process chart is displayed based on the analysis results, allowing an operator to easily understand the machining, find a setting error easily in the machining program and correct the machining program.

BRIEF DESCRIPTION OF THE DRAWINGS

FIG. 2A is a flow chart explaining the method for creating a process chart.

FIG. 2B is a flow chart explaining the method for creating a process chart.

FIG. 2D is a flow chart explaining the method for creating a process chart.

FIG. 3B is a detailed illustration of the process chart of FIG. 3A.

FIG. 3C is an example of a preview window displayed on the displaying section of the control device of FIG. 1.

FIG. 4A is an example of data of the tools to be used displayed on the displaying section of the control device of FIG. 1.

FIG. 4B is an example of a list of the tools to be used displayed on the displaying section of the control device of FIG. 1.

FIG. 5A is an example of a screen for setting the coordinate system displayed on the displaying section of the control device of FIG. 1.

FIG. 5B is an example of a list of the coordinate systems to be used displayed on the displaying section of the control device of FIG. 1.

DETAILED DESCRIPTION OF THE INVENTION

With reference to the drawings, an embodiment of the invention will be described below.

Figure 1:
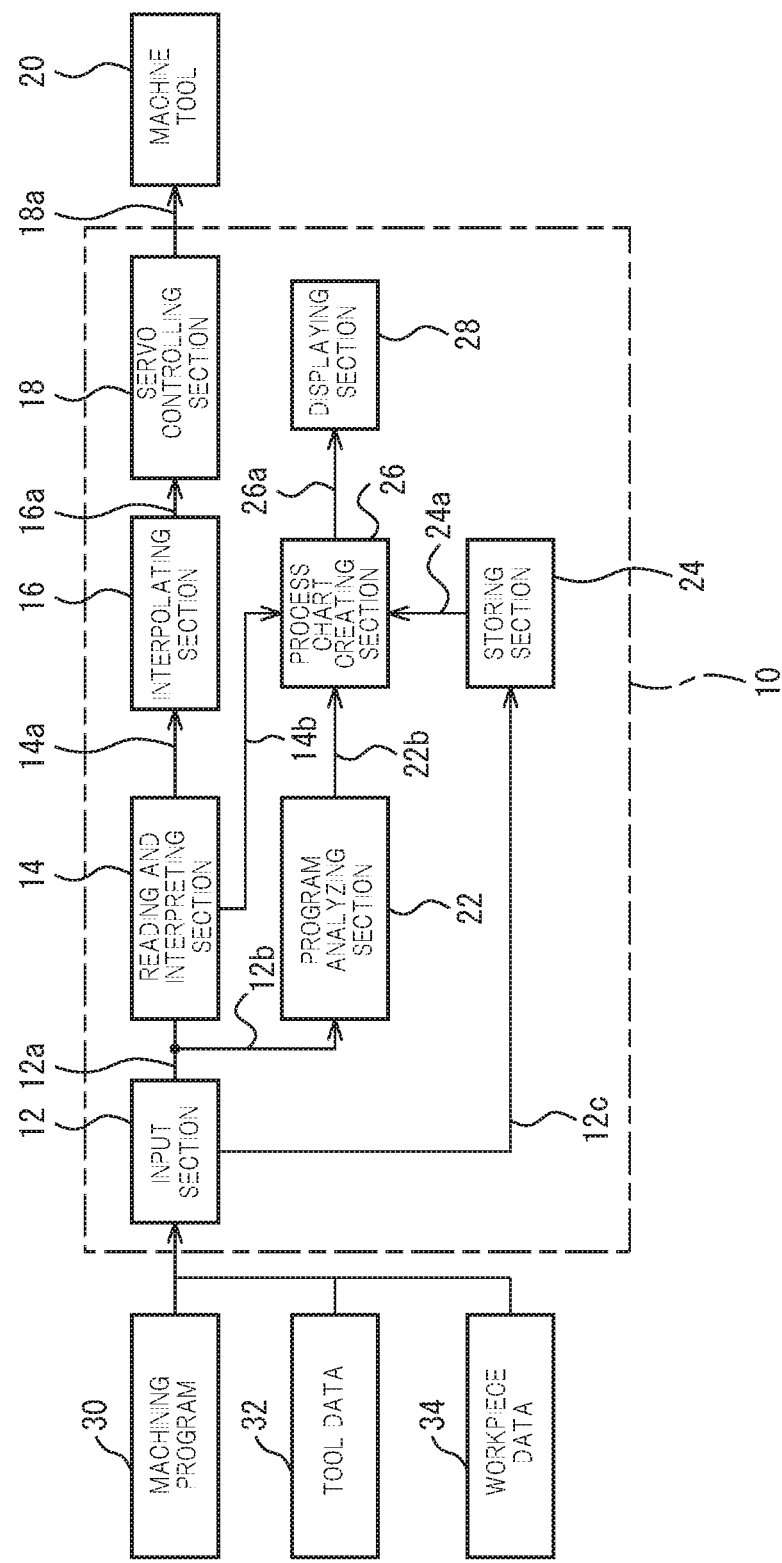
FIG. 1 is a block diagram showing an example of a control device for a machine tool according to the invention.
Figure 2C:
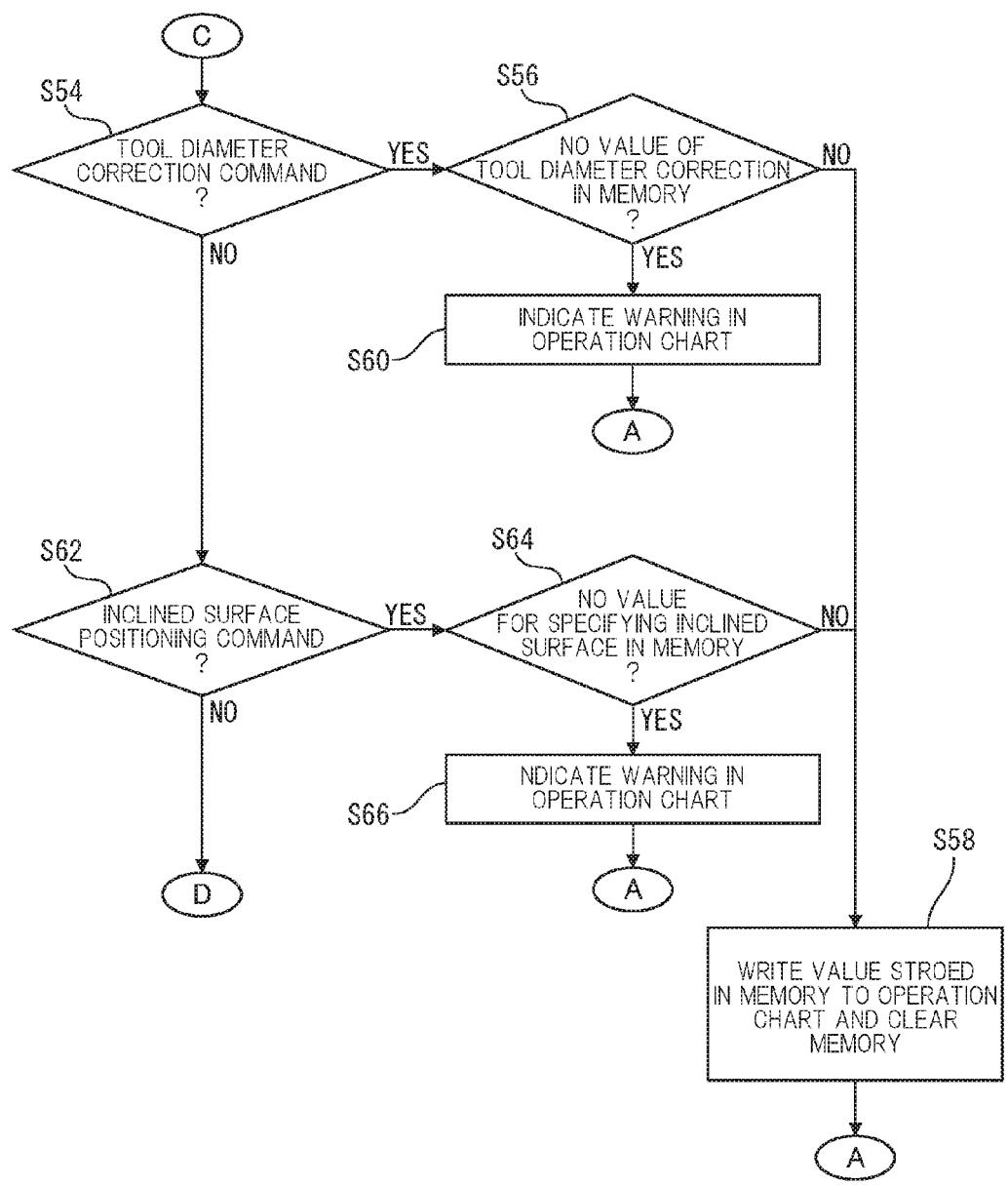
FIG. 2C is a flow chart explaining the method for creating a process chart.

In FIG. 1, a control device 10 of a machine tool 20 according to an embodiment of the invention can be formed so as to include an NC device of the machine tool 20, and comprises an input section 12, a reading and interpreting section 14, a interpolating section 16, a servo-control section 18, a program analyzing section 22, a storage section 24, a process chart creating section 26 and a displaying section 28. The input section 12 may comprise a network means e.g., a LAN, a keyboard or a touch panel. The displaying section 28 can be formed by a display attached to an NC device of the machine tool 20.

A machining program 30, tool data 32 and workpiece data 34 are input into the input section 12. The machining program 30 can be generated by using for example a CAM system. The tool data 32 includes coded information of tools such as tool lengths, tool diameters the number of cutting edges, and the tool types i.e., end mill, drill and tap, associated with the tool numbers. The tool data 32 may be stored in a server in relation to all of the tools used in a factory. From the server, the tool data may be sent to the input section 12 via a LAN. The tool data may be input by a CAM operator or an operator of the machine tool 20. The workpiece data 34 is data relative to a workpiece coordinate system determining a point on a surface of the workpiece as the origin. The workpiece data 34 may be sent from a CAD system to the input section 12 via a LAN. The workpiece data may be input by a CAM operator or an operator of the machine tool 20.

The machining program 30 input into the input section 12 is output to the reading and interpreting section 14 as shown by an arrow 12a. The reading and interpreting section 14 reads and interprets so that operation commands 14a are output. The operation commands include the feeding amounts and speeds in the X-, Y- and Z-axis directions. The operation commands 14a, which have been output by the reading and interpreting section 14, are sent to the interpolating section 16.

The interpolating section 16 interpolates the operation commands 14, in the X-, Y- and Z-axis directions, via calculation based on an interpolation function, so that position commands (pulse position commands) 16a are output to the servo-control section 18 based on the respective X-, Y- and Z-axial feed speeds. Based on the respective X-, Y- and Z-axial position commands 16a, the servo-control section 18 outputs electric currents 18a to X-, Y- and Z-axial servomotors (not shown) of the machine tool 20, for driving X-, Y- and Z-axes of the machine tool 20 respectively.

The machining program 30 is also sent to the program analyzing section 22 as shown by an arrow 12b. The program analyzing section 22 analyzes the machining program, written by G code or the like, so that the machining program is sent word by word to the process chart creating section 26, as shown by an arrow 22a. Further, an arrow 14b shows the information of the running program which is sent to the process chart creating section 26 from the reading and interpreting section 14. The process chart creating section 26 creates a process chart based on the machining program, which has been read word by word from the program analyzing section 22, and the tool data from the storing section 24. The process char is displayed on the displaying section 26.

Figure 3A:
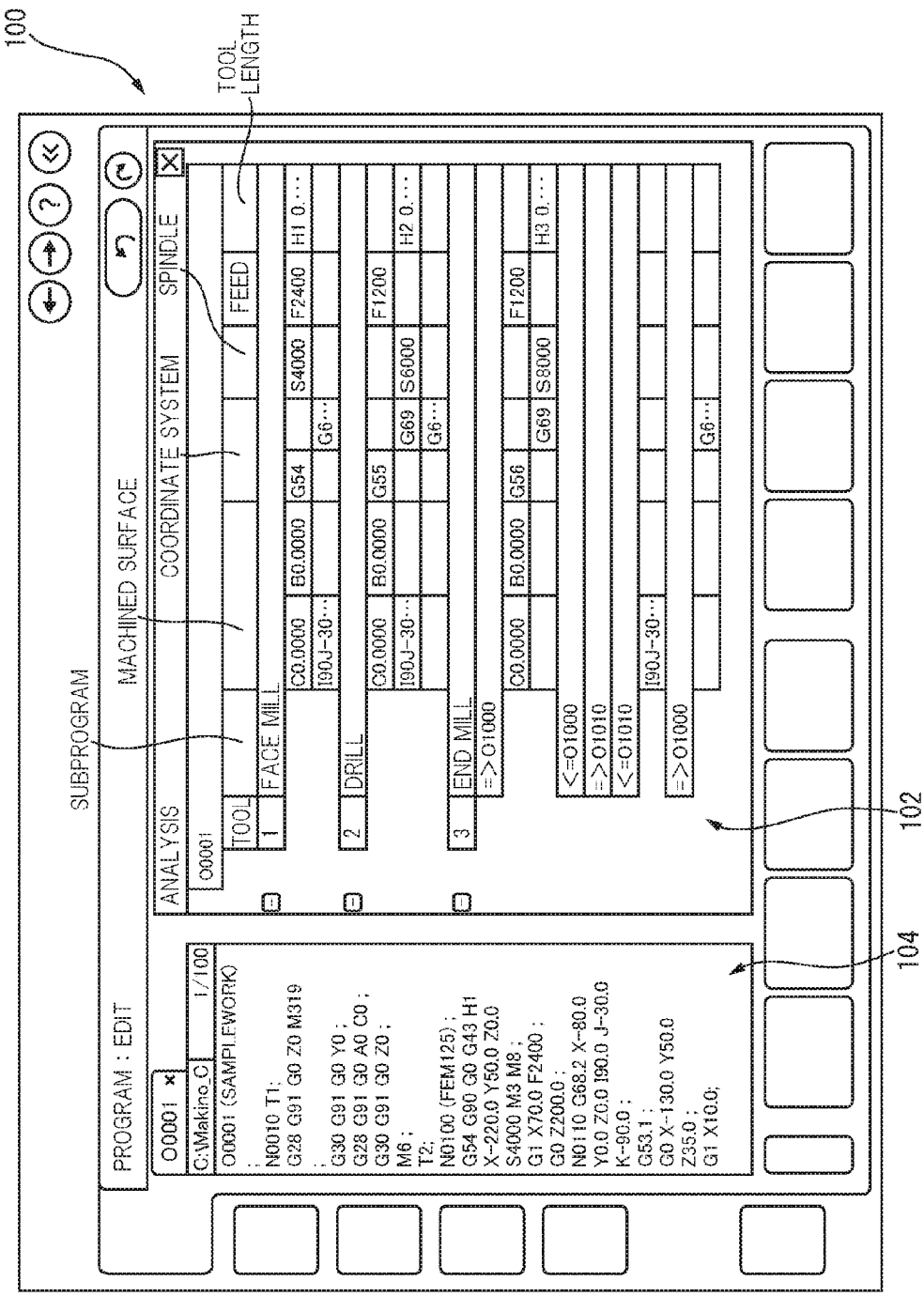
FIG. 3A is an example of the process chart displayed on a displaying section of the control device of FIG. 1.

With reference to FIG. 3A, an example of the process chart which is displayed on the displaying section 28 is shown. In FIG. 3A, a window 100 includes a schedule region 102 and a machining program region 104. Showing the schedule and the machining program simultaneously allows an operator to easily find an error in the machining program by simultaneously referring the schedule and the machining program. When a part of the schedule is selected by tapping it with a pointing device or a cursor, the corresponding part in the machining program is highlighted and the cursor moves to the corresponding part in the machining program. Further, when the machining program is running, the running process is highlighted based on running program block information from the reading and interpreting section 14. This facilitates understanding the correspondence between the schedule and the actual machining program.

With reference to FIG. 3B, the entire schedule, which is displayed in the region 102, is shown. In this example, the schedule 200 is composed of the respective processes of a machining program which are arranged in the execution sequence, and paragraphed in relation to the tools to be changed or the surfaces to be machined. Further, the schedule 200 includes items of tool type 202, subprogram 204, angle of the machined surface 206, coordinate system setting 208, spindle rotational speed 210, cutting feed speed 212, tool length correcting value 214 and tool diameter correcting value 216.

In FIG. 3B, the tool type 202 includes 1: face mill, 2: drill and 3: end mill. The details of the subprogram 204 are described in the portion indicated by reference 204. Further, in the example of FIG. 3B, 0.0 degree around A-axis and C-axis is shown as the machined surface angle 206, G54, G55 and G 56 are shown as the setting of coordinate system 208, which is generally designated by G54-G59 of the G-code, 4000 (l/min), 6000 (l/min) and 8000 (l/min) are shown as the spindle rotational speed 210, 2400 (mm/min), error and 12000 (mm/min) are shown as the cutting feed speed 212, and 80.1234 (mm), 234.5678 (mm) and 111.2222 (mm) are shown as the tool length correcting value 214 and 62.5 (mm) and 4.0 (mm) are shown as the tool diameter correcting value 216. The error indication means that the pertinent value is not described in the machining program.

The program for creating the schedule 102 of FIG. 3A may be formed as one of the subroutines of a program for managing the machining data of the control device 10. Therefore, storing the schedule 102 associated with the machining data facilitates understanding the detail of the machining program by displaying the schedule 102 within for example a preview window as shown in FIG. 3C when used again on a later date. The preview window 300 for managing the machining data, shown in FIG. 3C as an example, includes a region 302 for displaying a schedule and a region 304 for displaying a list of file names of machining programs. When a program name in the region 304 is clicked or tapped, a past schedule, corresponding to the machining program, is displayed within the region 302.

Although, schedule 200 shown in FIG. 3B includes the tool type 202, the subprogram 204, the machined surface angle 206, the coordinate system setting 208, the spindle rotational speed 210, the cutting feed speed 212, the tool length correcting value 214 and the tool diameter correcting value 216, only specific item(s) may be displayed. For example, only the tools, which are used for a specific machining program, may be displayed as shown in FIG. 4A. In the example of FIG. 4A, tool number 400, use/nonuse 402 of a tool pot, tool type 404, tool diameter 406, tool length 408 and the number of cutting edges of each of the tools used for a machining program 300. Accordingly, setting errors can be reduced by displaying only the data relative to the tools used for a specific machining program. Further, as shown in FIG. 4B, a list may be created for all of the tool used for a plurality of machining programs which may be executed, not for a single machining program. In the example of FIG. 4B, the tools (tool numbers 502-1 to 502-14), which are used for machining program (program number O500) are indicated by circle marks. This prevents the tools, which may be used, to be mistakenly removed from a tool magazine.

Further, as shown in FIG. 5A, only the coordinate system, which is used for a machining program, may be displayed. In the example of FIG. 5A, the definitions of the workpiece coordinate system command G54, G55 and G54.1, which are used for a machining program, indicated by program number 0100, are displayed. Accordingly, setting errors can be reduced by displaying only the coordinate systems which are used in a machining program. Further, as shown in FIG. 5B, a list may be created for all of the coordinate system used for a plurality of machining programs which may be executed, not for a single machining program. In the example of FIG. 5B, the workpiece coordinate system commands G54 and G54.1 are overlapped in the machining programs O100 and O200. In such a case, it is possible to indicate a warning 600 that a workpiece coordinate system is redundantly wrote in a plurality of machining programs. This prevents redundant use of a coordinate system by mistake.

With reference to a flow chart shown in FIGS. 2A-2D, a method for creating the schedule, below.

After a schedule creating program is activated (step S10), the process chart creating section 26 reads one word of a machining program from the program analyzing section 22 (step S12). Then, through steps S14-S26, it is determined that the one word is the tool number, the spindle rotational speed, the speed of cutting feed, the positioning of a machined surface, the tool length correcting value, the tool diameter correcting value or the designation of an inclined surface. If the one word is one of the tool number, the spindle rotational speed, the speed of cutting feed, the positioning of a machined surface, the tool length correcting value, the tool diameter correcting value and the designation of an inclined surface, i.e., Yes at one of the steps S14-S26, then the command value is stored in a predetermined region of a memory (step S28), and the flow goes back to the step S12 so that the next one word of the machining program is read.

If the judgment is No at any one of the steps S14-S26, then it is determined whether or not the one word is a call command for calling a subprogram at step S30. If the one word is a call command for calling a subprogram (Yes at the step S30), then a command value of the subprogram is wrote to the schedule (step S34), and the flow goes back to the step S12 so that the next one word of the machining program is read.

If the one word is not a call command for calling a subprogram (No at the step S30), then it is determined whether or not the one word is a designation command for designating a workpiece coordinate system, at step S32. If the one word is a designation command for designating a workpiece coordinate system (Yes at the step S32), then the command value of designation of the workpiece coordinate system is wrote to the schedule, and the flow goes back to the step S12 so that the next one word of the machining program is read.

If the one work is not a designation of a workpiece coordinate system (No at the step S32), then it is determined whether or not the one word is a tool changing command, at step S34. If the one word is a tool changing command (Yes at the step S34), it is determined whether or not a value of the tool number is stored in the memory region (step S36). At the step 36, if no tool number is stored in the memory region (Yes at the step S36), then a warning (error) is indicated in the schedule (step S40). If a tool number is stored in the memory region (No at the step 36), then the value (the tool number) which is stored in the memory is wrote to the schedule, the memory region is cleared (the step S38), and the flow goes back to the step S12 so that the next one word of the machining program is read.

If the one word is not a tool changing command (No at the step S34), then it is determined whether or not the one word is a spindle activating command at step S42. If the one word is a spindle activating command (Yes at the step S42), then it is determined whether or not a value of the spindle rotational speed is stored in the memory region (step S44). At the step S44, if no spindle rotational speed is stored in the memory region (Yes at the step S44), then a warning (error) is indicated in the schedule (step S46).

If a spindle rotational speed is stored in the memory region (No at the step 44), then the value (the spindle rotational speed) which is stored in the memory is wrote to the schedule, the memory region is cleared (the step S38), and the flow goes back to the step S12 so that the next one word of the machining program is read.

If the one word is not a spindle activating command (No at the step S42), then it is determined whether or not the one word is a tool length correcting command at step S48. If the one word is a tool length correcting command (Yes at the step S48), then it is determined whether or not a tool length correcting value is stored in the memory region (step S50). At the step S50, if no tool length correcting value is stored in the memory region (Yes at the step S50), then a warning (error) is indicated in the schedule (step S52).

If a tool length correcting value is stored in the memory region (No at the step 50), then the value (the tool length correcting value) which is stored in the memory is wrote to the schedule, the memory region is cleared (the step S38), and the flow goes back to the step S12 so that the next one word of the machining program is read.

If the one word is not a tool length correcting command (No at the step S48), then it is determined whether or not the one word is a tool diameter correcting command at step S54. If the one word is a tool diameter correcting command (Yes at the step S54), then it is determined whether or not a tool diameter correcting value is stored in the memory region (step S56). At the step S56, if no tool diameter correcting value is stored in the memory region (Yes at the step S56), then a warning (error) is indicated in the schedule (step S60). If a tool diameter correcting value is stored in the memory region (No at the step 56), then the value (the tool diameter correcting value) which is stored in the memory is wrote to the schedule, the memory region is cleared (the step S58), and the flow goes back to the step S12 so that the next one word of the machining program is read.

If the one word is not a tool diameter correcting command (No at the step S54), then it is determined whether or not the one word is an inclined surface designating command at step S62. If the one word is an inclined surface designating command (Yes at the step S62), then it is determined whether or not an inclined surface designating value is stored in the memory region (step S64). At the step S64, if no inclined surface designating correcting value is stored in the memory region (Yes at the step S64), then a warning (error) is indicated in the schedule (step S66). If an inclined surface designating value is stored in the memory region (No at the step S64), then the value (the inclined surface designating value) which is stored in the memory is wrote to the schedule, the memory region is cleared (the step S58), and the flow goes back to the step S12 so that the next one word of the machining program is read.

If the one word is not an inclined surface designating command (No at the step S62), then it is determined whether or not the one word is a cutting mode switching command at step S68. If the one word is not a cutting mode switching command (No at the step S68), then it is determined whether or not the one word is a program ending command at step S70. If it is a program ending command (Yes at the step S70), then the schedule creating program is ended (step S72). If it is not a program ending command, then the flow goes back to the step S12 so that the next one word of the machining program is read.

If the one word is a cutting mode switching command (Yes at the step S68), then it is determined whether or not the cutting mode switching command is a switching command from a rapid feed mode to a cutting feed mode. If the one word is not a switching command from a rapid feed mode to a cutting feed mode (No at the step S74), then the flow goes back to the step S12 so that the next one word of the machining program is read.

If the one word is a switching command from a rapid feed mode to a cutting feed mode, i.e., a command for starting a cutting process (Yes at the step S74), an angle information of the machined surface is wrote to the schedule (step S76), if the angle of the machined surface is changed. Then, it is determined whether or not a cutting feed speed is stored in a predetermined memory region (step S78). At the step S78, if no cutting feed speed is stored in the memory region (Yes at the step S78), then a warning (error) is indicated in the schedule (step S82), and the flow goes back to the step S12 so that the next one word of the machining program is read. If a cutting feed speed is stored in the memory region (No at the step S78), then the cutting feed speed is wrote to the schedule (step S80), and the flow goes back to the step S12 so that the next one word of the machining program is read.

The schedule of FIG. 3A sorts the data on the basis of the tool to be used, so that the currently running machining process is indicated apparently in relation to "the used tool, the running machining program, the machined surface, the coordinate system and the machining condition". Further, by sorting the data on the basis of the machined surface, instead the tool to be used, the currently running machining process is indicated apparently in relation to "the machined surface, the used tool, the running machining program and the machining condition".

As described above, an error is indicated when a necessary program information is not described in a machining program or there is no subprogram which should be called, enabling the machining program to be corrected easily.

REFERENCE SIGNS LIST

10 Control Device
12 Input Section
14 Reading and Interpreting Section
16 Interpolating Section
18 Servo-Control Section
20 Machine Tool
22 Program Analyzing Section
24 Storing Section
26 Process Chart Creating Section
28 Displaying Section
30 Machining Program
32 Tool Data
34 Workpiece Data

The invention claimed is:

1. A control device for controlling a machine tool based on a machining program, comprising:
   a program analyzing section for analyzing the machining program which has been input;
   a process chart creating section for determining whether or not the machining program includes a tool changing command or a command for changing angle of surface to be machined, based on the analyzing by the program analyzing section, and creating a schedule by arranging processes of the machining program in an execution sequence of the machining program, wherein the machining processes are sorted in the schedule according to tools to be changed if a tool machining command is included in the machining program or according to the surface to be machined if a command for changing angle of the machined surfaces is included; and
   a displaying section for displaying the schedule created by the process chart creating section and the machine program at the same time.

2. The control device according to claim 1, further comprising an input section, the machining program being input through the input section along with tool data and workpiece data.

3. The control device according to claim 1, wherein it is determined whether or not a value of the tool number is stored in the memory region, when a tool changing command is detected, and an error is indicated if no tool number is stored in a memory region.

* * * * *